Jan. 18, 1966 S. B. PRELLWITZ 3,230,363
RADIATION-RESPONSIVE STOCKLINE INDICATOR
Filed June 13, 1962 3 Sheets-Sheet 2
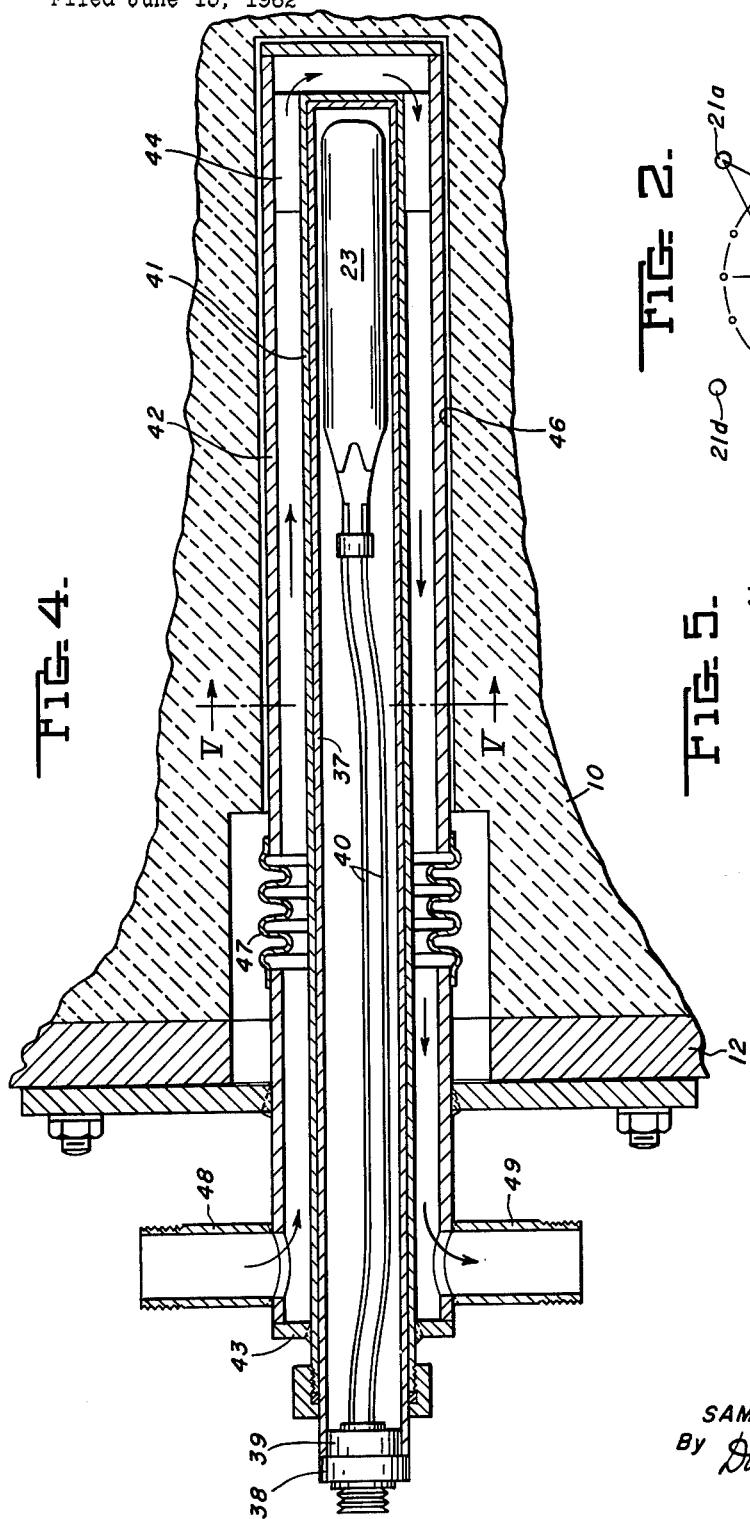
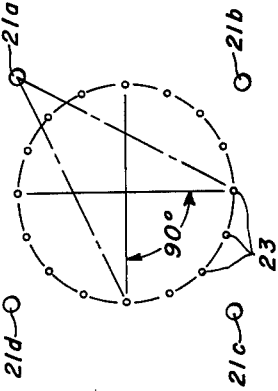
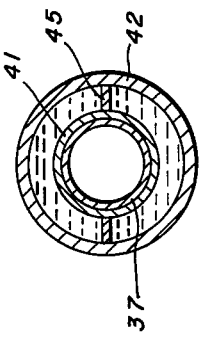
INVENTOR.
SAMUEL B. PRELLWITZ
By Donald G. Dalton
Attorney Jan. 18, 1966  S. B. PRELLWITZ  3,230,363
RADIATION-RESPONSIVE STOCKLINE INDICATOR
Filed June 13, 1962  3 Sheets-Sheet 3
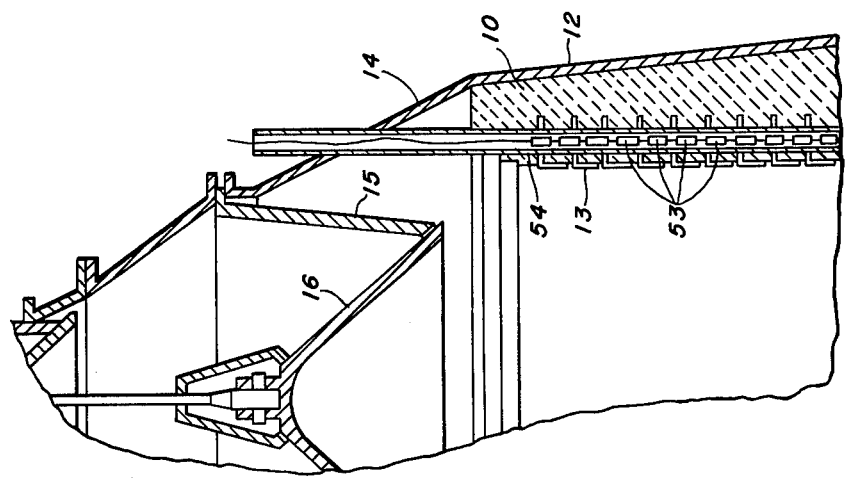
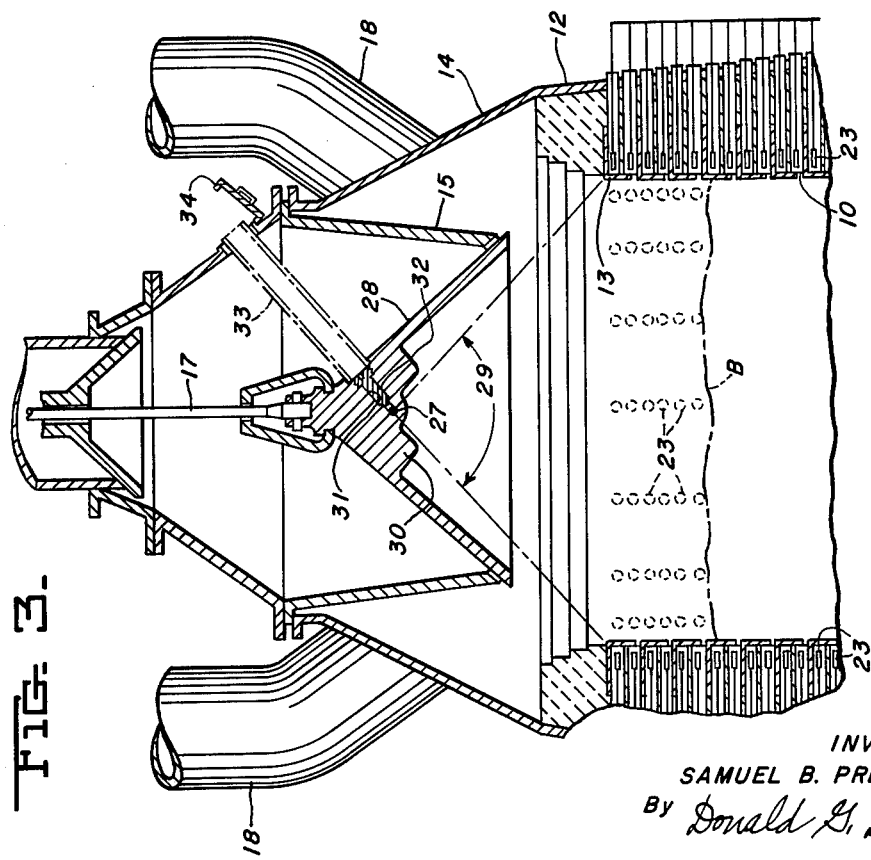
INVENTOR.
SAMUEL B. PRELLWITZ
By Donald G. Dalton
Attorney

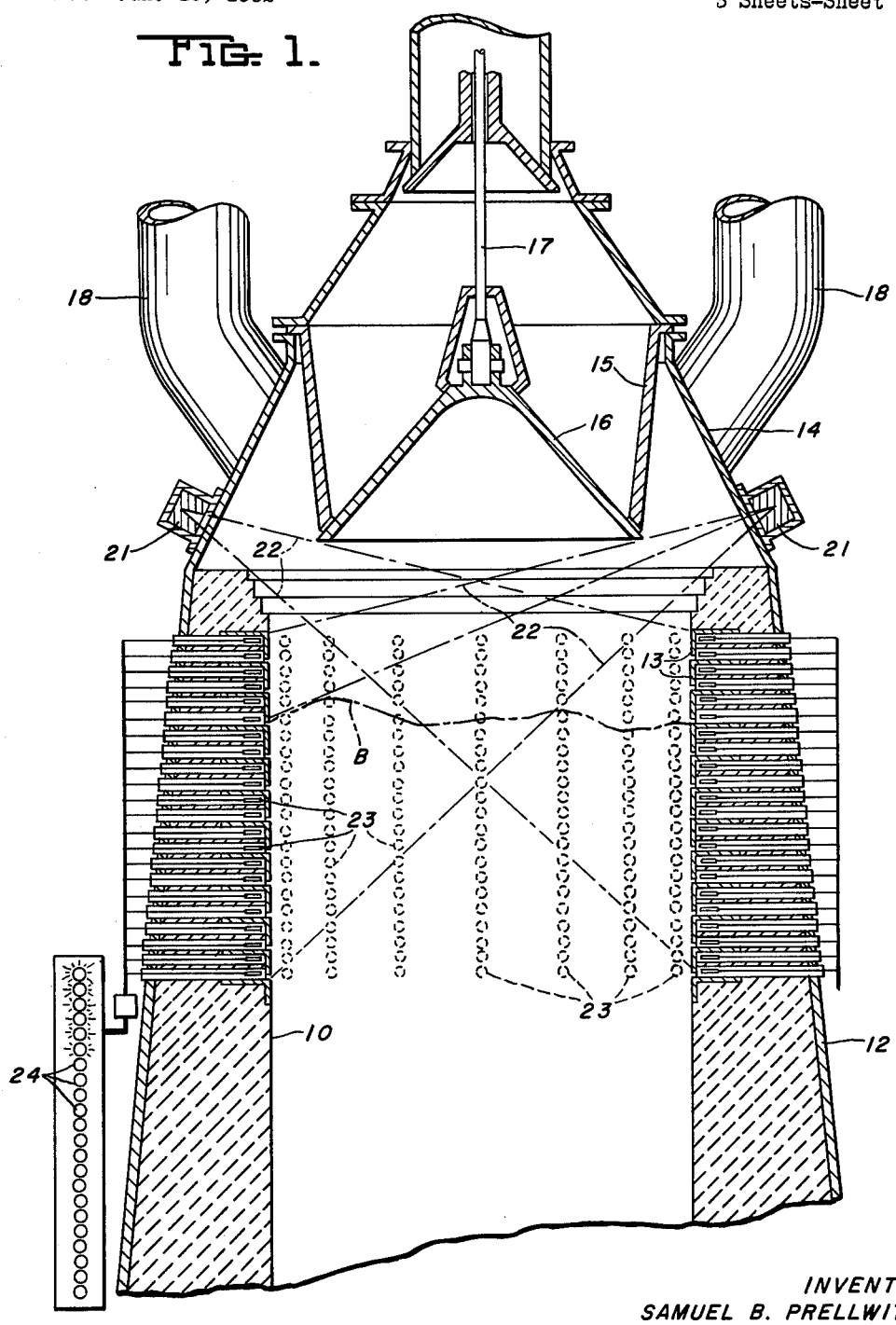

United States Patent Office 3,230,363
Patented Jan. 18, 1966

3,230,363
RADIATION-RESPONSIVE STOCKLINE
INDICATOR
Samuel B. Prellwitz, Pittsburgh, Pa., assignor to United States Steel Corporation, a corporation of New Jersey
Filed June 13, 1962, Ser. No. 202,138
6 Claims. (Cl. 250—43.5)

This invention relates to improved arrangements of radiation devices for indicating the stockline level in a blast furnace.

Conventionally a blast furnace is equipped with a mechanism for indicating the level of the stockline to assist the operator in controlling the furnace, for example, to guide him in charging new materials. The most common form of stockline indicator utilizes a mechanical probe, but radiation devices also have been used for the purpose, as shown for example in British Patent No. 894,352. The usual radiation level-indicating device includes one or more radiation sources (commonly gamma rays) and corresponding detectors mounted opposite the sources on the outside of a vessel. The rays are of a strength that they penetrate the walls of the vessel and energize the detector when the level of material in the vessel is lower than the detector, but not when the level is above the detector. When such devices are used on a blast furnace, the practice has been to form ports in the refractory lining adjacent both the source and the detector, since otherwise the lining is too thick for the rays to penetrate. However, this arrangement has disadvantages that it is difficult to align holes accurately on opposite sides of a furnace, and I doubt that the arrangement can be installed on a furnace while in operation. Furthermore the device can indicate only that the stockline is above or below given levels, but it cannot continuously follow stockline movement.

An object of the present invention is to provide improved arrangements of radiation devices for indicating the stockline level in a blast furnace, which arrangements overcome disadvantages encountered heretofore.

A further object is to provide improved arrangements of radiation devices for indicating the stockline level in a blast furnace in which the radiation source is located above the refractory lining and the detectors are embedded in the lining.

A further object is to provide improved arrangements of radiation devices in which a single radiation source can act on detectors spaced around a relatively wide arc of a furnace wall.

A further object is to provide an improved mounting for a radiation source in the large bell of a blast furnace.

A further object is to provide an improved water-cooled mounting for a radiation detector in a blast furnace wall.

In accomplishing these and other objects of the invention, I have provided improved details of structure, preferred forms of which are shown in the accompanying drawings, in which:

FIGURE 1 is a vertical sectional view of the upper portion of a blast furnace equipped with one arrangement of radiation devices in accordance with my invention;

FIGURE 2 is a diagrammatic plan view illustrating how the arrangement of radiation devices shown in FIGURE 1 can reach a wide arc of the furnace wall;

FIGURE 3 is a view similar to FIGURE 1, but showing a modified arrangement;

FIGURE 4 is a longitudinal sectional view on a larger scale of the mounting for the detectors shown in both FIGURES 1 and 3;

FIGURE 5 is a vertical cross section on line V—V of FIGURE 4; and

FIGURE 6 is a diagrammatic vertical sectional view of a modified form of mounting for the detectors applicable to the arrangement shown in either FIGURE 1 or FIGURE 3.

FIGURE 1 shows diagrammatically a portion of a conventional blast furnace, which includes walls formed of a refractory lining 10, a metal shell 12 surrounding the outside of the refractory, and stockline armor plates 13 on the inside of the refractory. The furnace also includes a cone plate 14 at the top of the shell, a large bell hopper 15 depending from the central portion of the cone plate, and a large bell 16 mounted for vertical movement in the hopper. The bell has an operating rod 17 attached to its apex. Conventional gas offtakes 18 extend from the cone plate. The furnace contains a burden B composed of the usual materials, commonly iron ore, coke and limestone. The furnace of course includes other conventional parts which I have not shown, since they are not involved in the present invention.

In accordance with my invention, I mount one or more downwardly directed gamma radiation sources 21 on the exterior of the cone plate 14 above the top of the refractory lining 10. Conveniently the source can be a body of cobalt 60 encased in a lead holder, which has a flaring aperture to emit radiation in a broad pattern. Since suitable radiation sources are known and available commercially, I have not shown nor described the source in detail. The rays penetrate the metal of the cone plate and thus flood the interior of the furnace over a broad expanse both horizontally and vertically, as lines 22 indicate.

I mount a series of vertically spaced detectors 23 in the furnace walls 10 below and opposite each radiation source 21. As best shown in FIGURE 2, the detectors opposite each radiation source 21 preferably occupy a relatively wide arc around the furnace wall. For example, the detectors to be actuated by a single source can occupy an arc of about 90°. In this manner four sources 21 located 90° apart can cover the full circumference of the furnace. Because of the high temperature encountered, I prefer to water-cool the detectors as described fully hereinafter. The detectors which lie above the upper face of the burden B (that is, the stockline) are exposed to radiation from the sources 21, while the burden shields those which lie below. I connect any suitable indicating or control means to the detectors to show which ones are exposed to radiation. Conveniently the indicating means can be a series of lamps 24 which are connected to the respective detectors. Each lamp is lighted when the corresponding detector is exposed to radiation. The stockline level at different places around the furnace circumference can be determined immediately by observation of which lamps are lighted. In this manner low spots in the burden can be observed quickly, as well as the general movement of the burden.

FIGURE 3 shows a modification in which I mount a downwardly directed radiation source 27 above the top of the refractory lining 10 in a specially constructed large bell 28. A single radiation source thus located floods the interior of the furnace in a conical pattern which can reach detectors 23 any place around the circumference of the furnace, as lines 29 indicate. The indicating means can be similar to those shown in FIGURE 1; hence the description is not repeated. Bell 28 has a thickened wall portion 30 around its apex. The radiation source 27 is housed in a bore 31 in the wall portion 30. This bore extends upwardly from a point near the apex of the bell to the exterior. A plug 32 is threadedly engaged with the bore or otherwise fixed therein to confine the radiation source. To insert or remove the radiation source, I remove plug 32 and attach a tube 33 to the upper end of the bore. Tube 33, when attached, extends through a door 34 in the top of the furnace to enable a suitable tool to be inserted for engaging the radiation source.

FIGURES 4 and 5 show in more detail one form of water-cooled mounting for the detectors 23 shown diagrammatically in FIGURES 1, 2 and 3. The detectors themselves can be conventional Geiger-Muller counters or any other suitable known type. Each detector is housed in an individual metal tube 37 which has a closed inner end and an insulating fitting 38 and a terminal plug 39 fixed in its exposed outer end. Wires 40 extend from plug 39 to the detector. Tube 37 is slidably received in an inner shell 41. An outer shell 42 surrounds the inner shell, which is held in place by an end plate 43 welded to both shells, a vertical baffle 44 and a horizontal baffle 45 (FIGURE 5). The outer shell 42 is mounted in a horizontal bore 46 in the furnace wall and is fixed to the furnace shell 12. The outer shell 42 preferably has a bellows section 47 to afford flexibility in the event there is relative movement between the furnace lining 10 and shell 12. The outer shell 42 has an inlet 48 and outlet 49 for admitting and discharging cooling water. The horizontal baffle 45 directs the water around the inner ends of shells 41 and 42 where it serves to cool the detector. As an alternative, I can mount tube 37 in a conventional cooling plate like those presently used in blast furnace walls.

FIGURE 6 shows a modified mounting for the detectors suitable for use in the embodiments shown in either FIGURE 1 or FIGURE 3. In this modification a series of detectors are physically connected end-to-end and are inserted in a vertically extending shell 54. The refractory lining 10 has a vertical bore adjacent its inner face receiving the shell 54. The shell can be water-cooled with a suitable baffle system similar to that shown in FIGURES 4 and 5.

From the foregoing description, it is seen that my invention affords a practical arrangement of radiation devices for indicating the stockline level in a blast furnace. The invention eliminates any need for aligning a source and a detector on opposite sides of a large furnace. By locating the detectors close to one another both vertically and horizontally, it is possible to follow the stockline movement closely throughout the furnace circumference. The arrangement can also be installed on an existing furnace. Since a smaller number of radiation sources are required and the sources need not be particularly strong, there is less hazard.

While I have shown and described certain preferred embodiments of my invention, it is apparent that other modifications may arise. Therefore, I do not wish to be limited to the disclosure set forth but only by the scope of the appended claims.

I claim:

1. The combination, with a blast furnace which has walls formed of a refractory lining and a metal shell surrounding the outside of said lining, a cone plate at the top of said shell above said lining, a large bell hopper carried by said cone plate, and a vertically movable large bell in said hopper for charging a burden from said hopper to the interior of the furnace, of means for indicating the stockline level, said means comprising a downwardly directed radiation source carried by the upper portion of the furnace above said lining for flooding the interior of the furnace with radiation in a pattern which is broad both vertically and horizontally, a plurality of vertically and circumferentially spaced radiation detectors mounted within the furnace lining adjacent the inside face thereof, said detectors occupying a relatively wide arc around the furnace wall and located where they are energized by said source except when covered by burden, and indicating means operatively connected with said detectors.

2. A combination as defined in claim 1 in which said source is mounted on the outside of said cone plate.

3. A combination as defined in claim 1 in which said source is mounted on said large bell near the apex thereof.

4. A combination as defined in claim 3 in which said bell has a thickened wall portion around its apex, said thickened wall portion has a bore extending upwardly from a point near the apex to the exterior, said bore housing said source, and including a plug in said bore to confine said source.

5. A combination as defined in claim 1 in which said lining and shell have horizontally extending openings, and including water-cooled shells mounted in said openings and supporting said detectors adjacent the inner face of said lining.

6. A combination as defined in claim 1 in which said lining has a vertical bore adjacent its inner face, and said detectors are connected end-to-end and inserted within said bore.

References Cited by the Examiner

UNITED STATES PATENTS

| 2,674,695 | 4/1954 | Grace | 250—43.5 |
| 2,713,124 | 7/1955 | Graham | 250—43.5 |
| 2,933,601 | 4/1960 | Friedman | 250—43.5 |
| 2,964,628 | 12/1960 | Ohmart | 250—43.5 |
| 3,011,662 | 12/1961 | Daily | 250—43.5 |

OTHER REFERENCES

Blast-Furnace Gamma Gage, by R. B. Spooner, from Nucleonics, vol. 19, No. 5, May 1961, pp. 56 to 59.

RALPH G. NILSON, *Primary Examiner.*

ARCHIE R. BORCHELT, *Examiner.*